G. D. Stevens,
Button Hook.

No. 108,063.      Patented Oct. 4, 1870.

Witnesses.
C. Wahlers
E. F. Kastenhuber

Inventor.
George D. Stevens
pr
Van Santvoord & Hauff
attys

United States Patent Office.

GEORGE D. STEVENS, OF NEW YORK, N. Y.

Letters Patent No. 108,063, dated October 4, 1870.

IMPROVEMENT IN BUTTON-HOOKS AND HANDKERCHIEF-HOLDERS COMBINED.

The Schedule referred to in these Letters Patent and making part of the same.

*To all whom it may concern:*

Be it known that I, GEORGE D. STEVENS, of the city, county, and State of New York, have invented a new and improved Button-Hook and Handkerchief-Holder Combined; and I do hereby declare the following to be a full, clear, and exact description thereof, which will enable those skilled in the art to make and use the same, reference being had to the accompanying drawing forming part of this specification, in which drawing—

Figure 1:
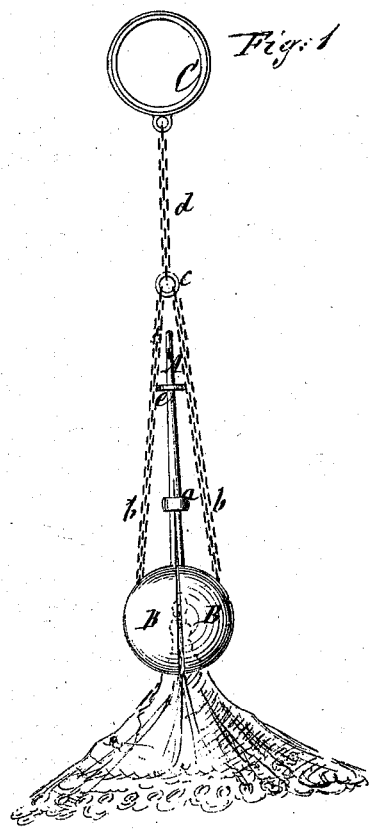
Figure 2:

Figure 1 represents a front view of this invention.
Figure 2 is a side view of the same.
Similar letters indicate corresponding parts.

This invention relates to a button-hook, the shank of which is split and connected to two jaws capable of clamping and retaining a handkerchief. From said jaws extend two chains, which connect at their ends with a branch chain attached to the suspension-ring, and said chains are also connected to a guide-ring sliding on the shank of the hook, so as to keep the device steady when it is to be used as a handkerchief-holder, and that, when the hook is to be used, the chains can be readily moved out of the way, so as not to interfere with the functions of the hook.

In the drawing—

The letter A designates a button-hook, the shank of which is split or partially made of two parts, each part being connected to a jaw, B, so that, by compressing the two parts of the shank, the jaws are also compressed, and a handkerchief, introduced between them, is firmly retained.

The jaws may be compressed by a sleeve, $a$, which slides on the shank of the hook, as shown in the drawing, or they may be compressed by any other suitable device.

From each of the jaws extends a chain, $b$, to a ring, $c$, which connects by another chain, $d$, with the suspension-ring C.

The chains $b\ b$ are both connected to a guide-ring, $e$, which slides freely up and down on the shank of the hook.

By these means the device is held steady in an upright position if used as a handkerchief-holder, and, if the button-hook is to be used, the chains can be readily moved out of the way, so as as not to interfere with the function of the hook.

My device is particularly intended for fastening glove-buttons, and its convenience for that purpose will be readily appreciated, but the hook may also be used for buttoning gaiters, or for fastening buttons of any description.

What I claim as new, and desire to secure by Letters Patent, is—

1. A button-hook and handkerchief-holder combined, as a new article of manufacture.

2. The guide-ring $e$, in combination with the chains $b\ b$, jaws B B, and hook A, substantially as set forth.

GEO. D. STEVENS.

Witnesses:
W. HAUFF,
E. F. KASTENHUBER.